(12) United States Patent
Lu et al.

(10) Patent No.: US 11,156,761 B2
(45) Date of Patent: Oct. 26, 2021

(54) KEYBOARD WITH LIGHT GUIDING NAMEPLATE

(71) Applicants: DEXIN ELECTRONIC LTD., Guangdong (CN); DEXIN CORPORATION, New Taipei (TW)

(72) Inventors: Ho-Lung Lu, New Taipei (TW); Kuan-Ling Chen, New Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 0 days.

(21) Appl. No.: 16/866,552

(22) Filed: May 5, 2020

(65) Prior Publication Data

US 2021/0191022 A1 Jun. 24, 2021

(30) Foreign Application Priority Data

Dec. 24, 2019 (TW) ................. 108217117

(51) Int. Cl.
*F21V 8/00* (2006.01)
*H01H 13/83* (2006.01)

(52) U.S. Cl.
CPC ........... *G02B 6/006* (2013.01); *G02B 6/0018* (2013.01); *H01H 13/83* (2013.01); *H01H 2219/036* (2013.01); *H01H 2219/06* (2013.01); *H01H 2219/062* (2013.01)

(58) Field of Classification Search
CPC ...... G02B 6/006; G02B 6/0018; H01H 13/83; H01H 2219/06; H01H 2219/036; H01H 2219/062
See application file for complete search history.

(56) References Cited

U.S. PATENT DOCUMENTS

| 7,338,193 | B1 * | 3/2008 | Zeiger | G02B 6/0001 |
| | | | | 362/551 |
| 7,938,563 | B2 * | 5/2011 | Hsieh | G06F 1/1656 |
| | | | | 362/276 |
| 2004/0223689 | A1 * | 11/2004 | Lempkowski | G02B 6/3604 |
| | | | | 385/26 |

(Continued)

FOREIGN PATENT DOCUMENTS

GB 2509906 A * 7/2014 ........... G06F 1/1637

*Primary Examiner* — Tsion Tumebo
(74) *Attorney, Agent, or Firm* — Li & Cai Intellectual Property Office

(57) ABSTRACT

A keyboard with a light guiding nameplate includes a keyboard body, a light source, and a light guiding nameplate. The keyboard body includes an outer housing, a plurality of keys, and a circuit board. The plurality of keys is exposed outside of the outer housing, and the circuit board is accommodated inside of the outer housing. The light source is disposed on the circuit board. The light guiding nameplate has a light incident surface, a reflective surface, and a light emergent surface. The light incident surface is located inside of the outer housing and adjacent to the light source, and the light emergent surface is located outside of the outer housing. The light source is configured to emit light to enter into the light guiding nameplate from the light incident surface, the light is totally reflected by the reflective surface, and then emerges from the light emergent surface.

9 Claims, 6 Drawing Sheets

(56) References Cited

U.S. PATENT DOCUMENTS

| | | | |
|---|---|---|---|
| 2006/0186359 A1* | 8/2006 | Suzukawa | G02B 6/0018 250/551 |
| 2008/0253070 A1* | 10/2008 | Rissanen | H04M 1/0218 361/679.01 |
| 2009/0244833 A1* | 10/2009 | Imamura | G06F 1/1616 361/679.55 |
| 2010/0202105 A1* | 8/2010 | Chang | G06F 1/1616 361/679.27 |
| 2010/0238667 A1* | 9/2010 | Wu | G09F 13/18 362/310 |
| 2016/0203742 A1* | 7/2016 | Peterson | G06F 1/1656 362/23.12 |

* cited by examiner

KEYBOARD WITH LIGHT GUIDING NAMEPLATE

CROSS-REFERENCE TO RELATED PATENT APPLICATION

This application claims the benefit of priority to Taiwan Patent Application No. 108217117, filed on Dec. 24, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a keyboard, and more particularly to a keyboard with a light guiding nameplate, in which the keyboard includes a light emitting nameplate for user identification.

BACKGROUND OF THE DISCLOSURE

Since computers have excellent information processing capabilities, the computer has become an important tool for people in both living or working circumstances. The keyboard is an indispensable peripheral for computer use. With the rise of the video game industry, the input devices of the computer peripherals used in the video game industry are constantly developing toward durability and precision.

However, if the input devices of the computer peripherals, especially the keyboard, could provide for unique identification among the same group of players or teams, it would provide another recognition level and more value.

SUMMARY OF THE DISCLOSURE

In response to the above-referenced technical inadequacies, the present disclosure provides a keyboard with a light guiding nameplate.

In one aspect, the present disclosure provides a keyboard with a light guiding nameplate. The keyboard with the light guiding nameplate includes a keyboard body, a light source, and a light guiding nameplate. The keyboard body includes an outer housing, a plurality of keys, and a circuit board, in which the plurality of keys are exposed outside of the outer housing, and the circuit board is accommodated inside of the outer housing. The light source is disposed on the circuit board. The light guiding nameplate has a light incident surface, a reflective surface, and a light emergent surface, in which the light incident surface is located inside of the outer housing and adjacent to the light source, and the light emergent surface is located outside of the outer housing. The light source is configured to emit light to enter into the light guiding nameplate from the light incident surface, and the light is totally reflected by the reflective surface, and then emerges from the light emergent surface.

Therefore, the keyboard with the light guiding nameplate enables the light source inside of the keyboard body to emit light to enter into the light guiding nameplate from the light incident surface, and the light is totally reflected by the reflective surface, and then emerges from the light emergent surface. The keyboard shows a recognition effect by light emission.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
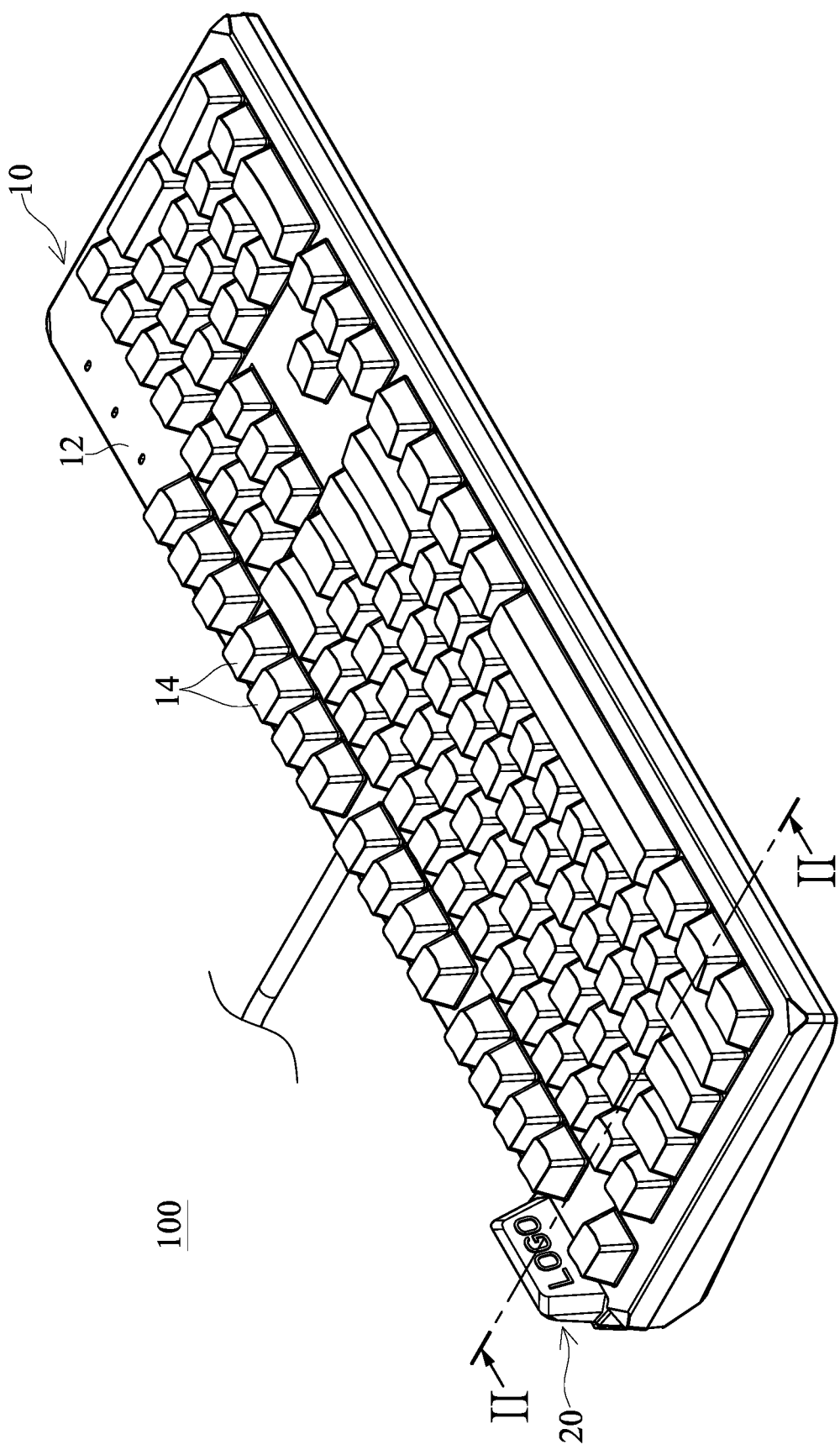
FIG. 1 is a perspective view of a keyboard with a light guiding nameplate according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
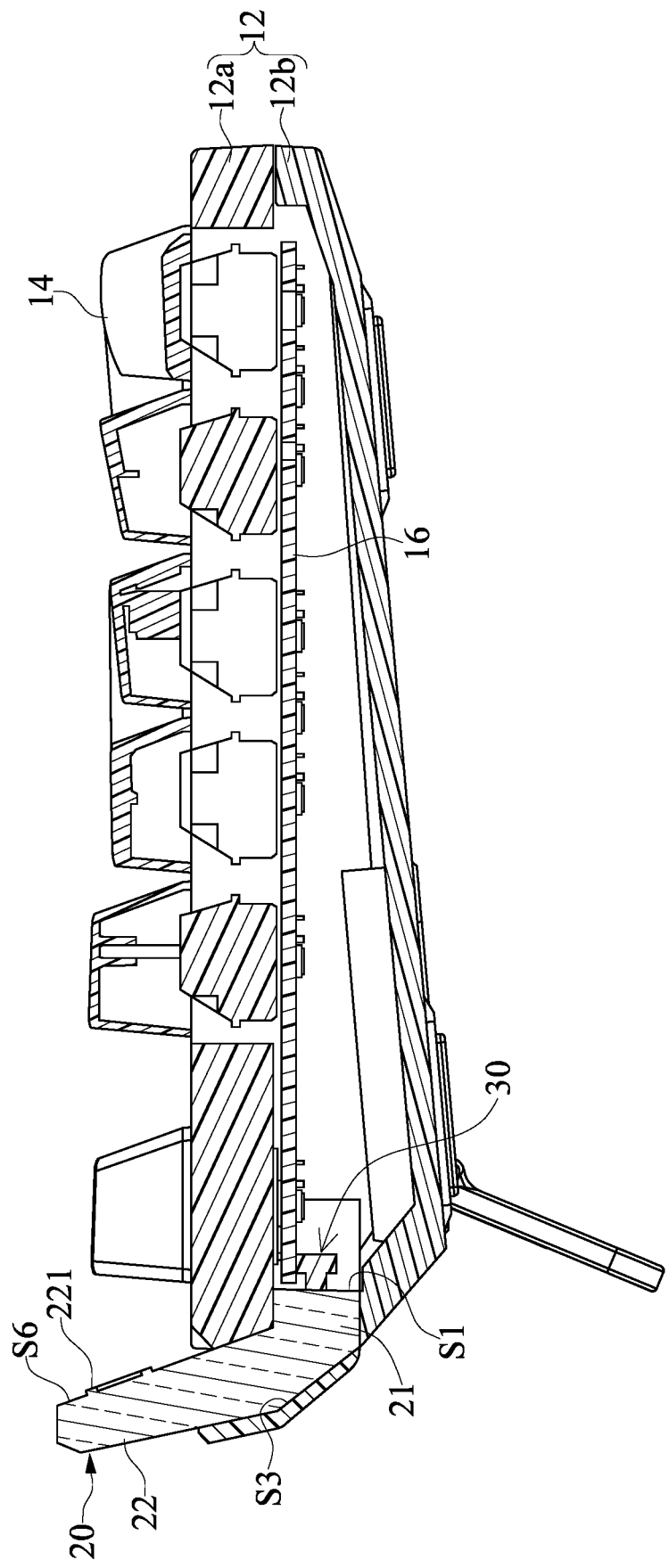
FIG. 2 is a schematic cross-sectional view taken along the II-II section of FIG. 1.

Referring to FIG. 1 and FIG. 2, the present disclosure provides a keyboard 100 with a light guiding nameplate. The keyboard 100 includes a keyboard body 10, a light guiding nameplate 20, and a light source 30. The keyboard body 10 includes an outer housing 12, a plurality of keys 14, and a circuit board 16. The plurality of keys 14 are exposed outside of the outer housing 12, and the circuit board 16 is accommodated inside of the outer housing 12.

The light source 30 is preferably disposed on the circuit board 16, and can be powered by the circuit board 16, but the present disclosure is not limited thereto. The light source 30 can also be individually disposed or fixed on the outer housing 12 of the keyboard body 10. The light source 30 of the present embodiment includes three light emitting diodes, but the quantity of the light emitting diodes is not limited thereto. The light emitting diodes are evenly distributed on the light incident surface S1.

Figure 3:
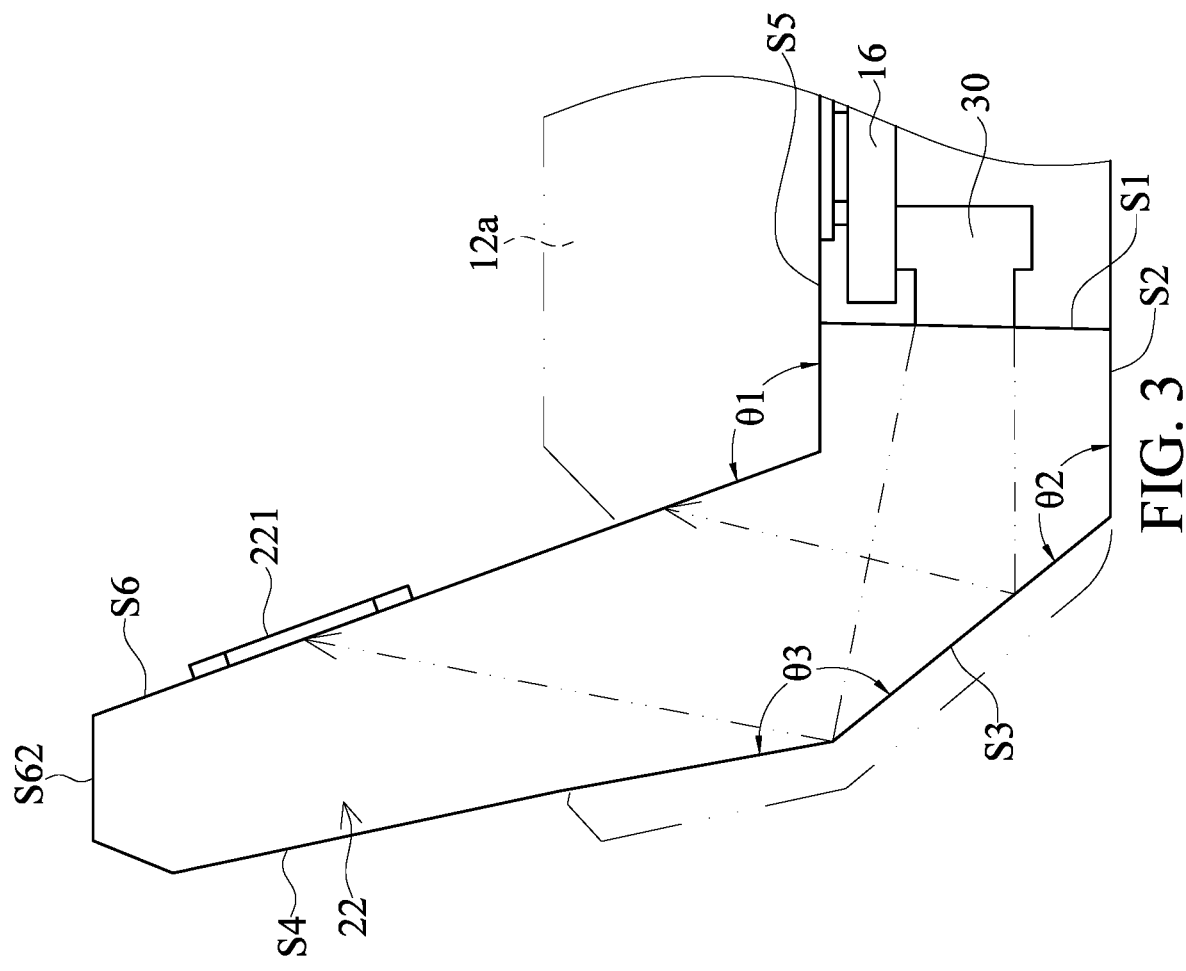
FIG. 3 is a partially enlarged schematic view of FIG. 2.

Referring to FIG. 2 and FIG. 3, the light guiding nameplate 20 has a light incident surface S1, a reflective surface S3, and a light emergent surface S6. The light incident surface S1 is located inside of the outer housing 12 and adjacent to the light source 30. The light emergent surface S6 is located outside of the outer housing 12. The light source 30 is configured to emit light to enter into the light guiding nameplate 20 from the light incident surface S1, and the light is totally reflected by the reflective surface S3, and then emerges from the light emergent surface S6. The light emergent surface S6 of the light guiding nameplate 20 can form a pattern 221, and the pattern 221 can, for example, be a text of a brand. Accordingly, the keyboard 100 of the present disclosure can provide the light guiding nameplate 30 with a recognition effect, and more particularly to provide the nameplate with a light emitting effect, so that users can quickly and simply realize the brand or characteristics of the keyboard 100 through the nameplate.

For example, the material of the light guiding nameplate 20 can be PMMA (also known as acrylic resin), since PMMA has characteristics of high light transmittance and total reflection of light. However, the present disclosure is not limited to the above described example.

As shown in FIG. 2 and FIG. 3, the light guiding nameplate 20 includes a fixing section 21 and a displaying section 22. The fixing section 21 is fixed inside of the outer housing 12, and the displaying section 22 extends outward from a front edge of the outer housing 12 and faces the plurality of the keys 14. The light incident surface S1 is formed on an end surface of the fixing section 21, and the light emergent surface S6 is formed on the displaying section 22. The outer housing 12 of the present embodiment can be divided into an upper shell 12a and a lower shell 12b. The displaying section 22 of the present embodiment passes through the upper shell 12a, and a height of the displaying section 22 is slightly greater than the plurality of keys 14.

As shown in FIG. 3, the light guiding nameplate 20 of the present embodiment has a special design so that the light from the light incident surface S1 can be totally reflected by the light guiding nameplate 20, and then reaches the light emergent surface S6. A top surface S5 of the fixing section 21 is adjacent to the light emergent surface S6. The top surface S5 of the fixing section 21 and the light emergent surface S6 together form a first obtuse angle $\theta 1$. For example, the first obtuse angle $\theta 1$ of the present embodiment is about 110 degrees, but the present disclosure is not limited thereto, for example, the first obtuse angle $\theta 1$ can be 100 degrees to 160 degrees.

A bottom surface S2 of the fixing section 21 is adjacent to the reflective surface S3, and the bottom surface S2 of the fixing section 21 and the reflective surface S3 together form a second obtuse angle $\theta 2$. The second obtuse angle $\theta 2$ is greater than the first obtuse angle $\theta 1$. For example, the second obtuse angle $\theta 2$ of the present embodiment is about 130 degrees, but the present disclosure is not limited thereto.

The displaying section 22 has an extending surface S4, and the extending surface S4 is opposite to the light emergent surface S6. The reflective surface S3 is adjacent to the extending surface S4. The reflective surface S3 and the extending surface S4 together form a third obtuse angle $\theta 3$, and the third obtuse angle $\theta 3$ is greater than the first obtuse angle $\theta 1$. For example, the third obtuse angle $\theta 3$ of the present embodiment is about 150 degrees, but the present disclosure is not limited thereto.

Figure 4:
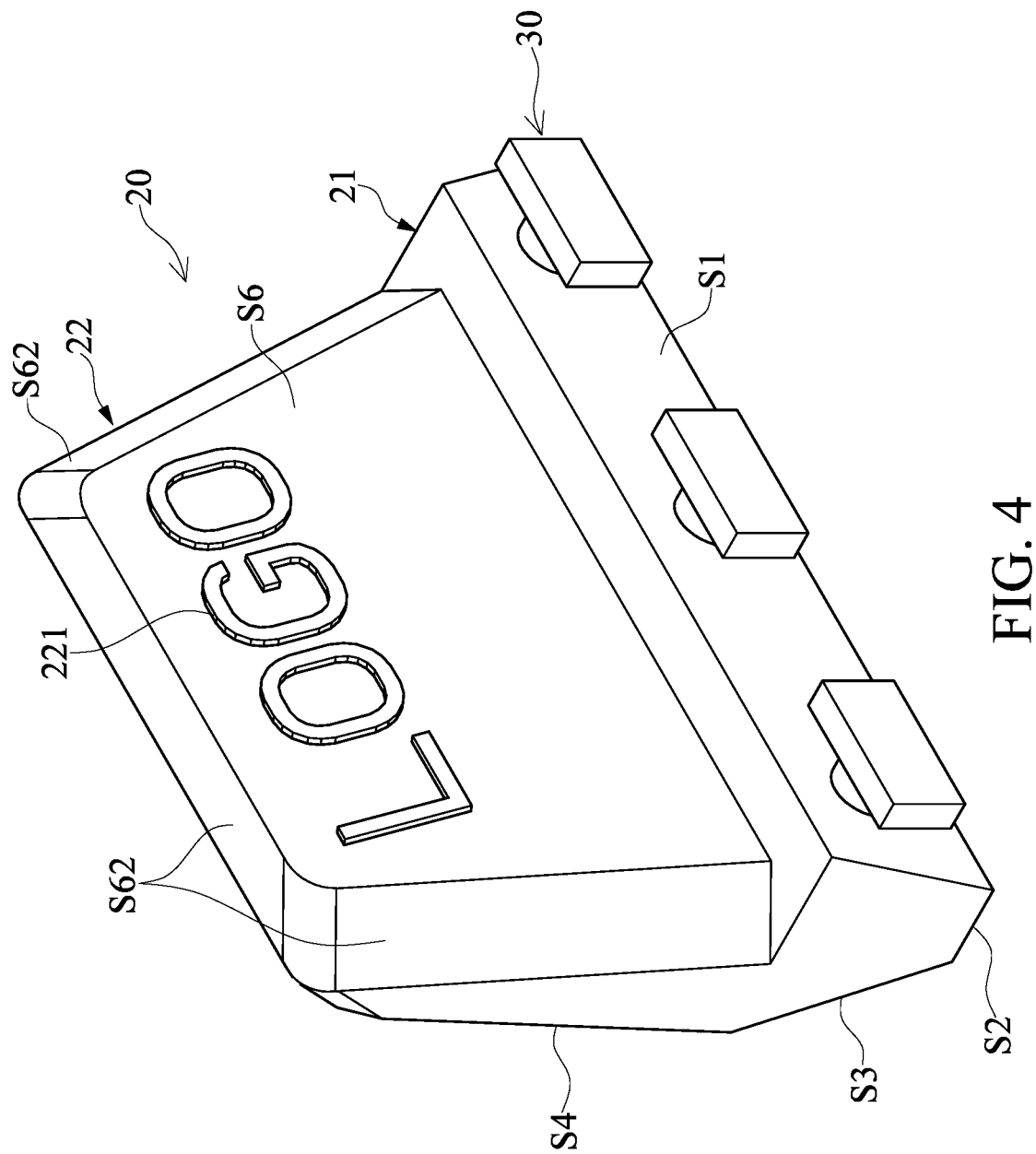
FIG. 4 shows a perspective view of the light guiding nameplate and a light source according to the embodiment of the present disclosure.

Referring to FIG. 4, the displaying section 22 of the light guiding nameplate 20 further has an outer inclined surface S62. The outer inclined surface S62 is roughly inverted U-shaped, and the outer inclined surface S62 surrounds the light emergent surface S6. The outer inclined surface S62 extends obliquely backward from the light emergent surface S6, and a part of light can also be transmitted outward through the outer inclined surface S62 by reflection. Accordingly, the light can form a light ring around a periphery of the light emergent surface S6.

Figure 5:
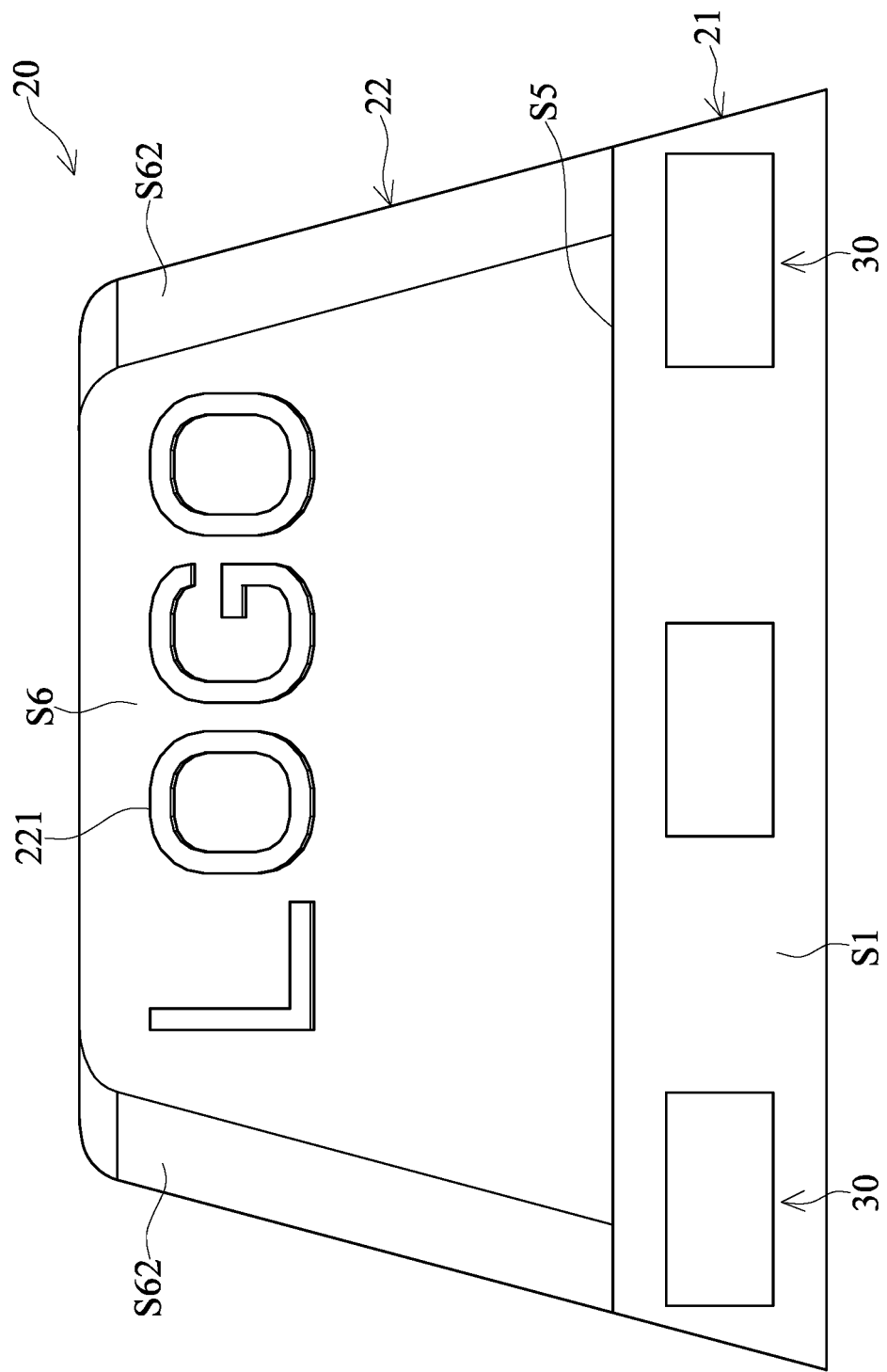
FIG. 5 shows a front view of the light guiding nameplate and the light source according to the embodiment of the present disclosure.
Figure 6:
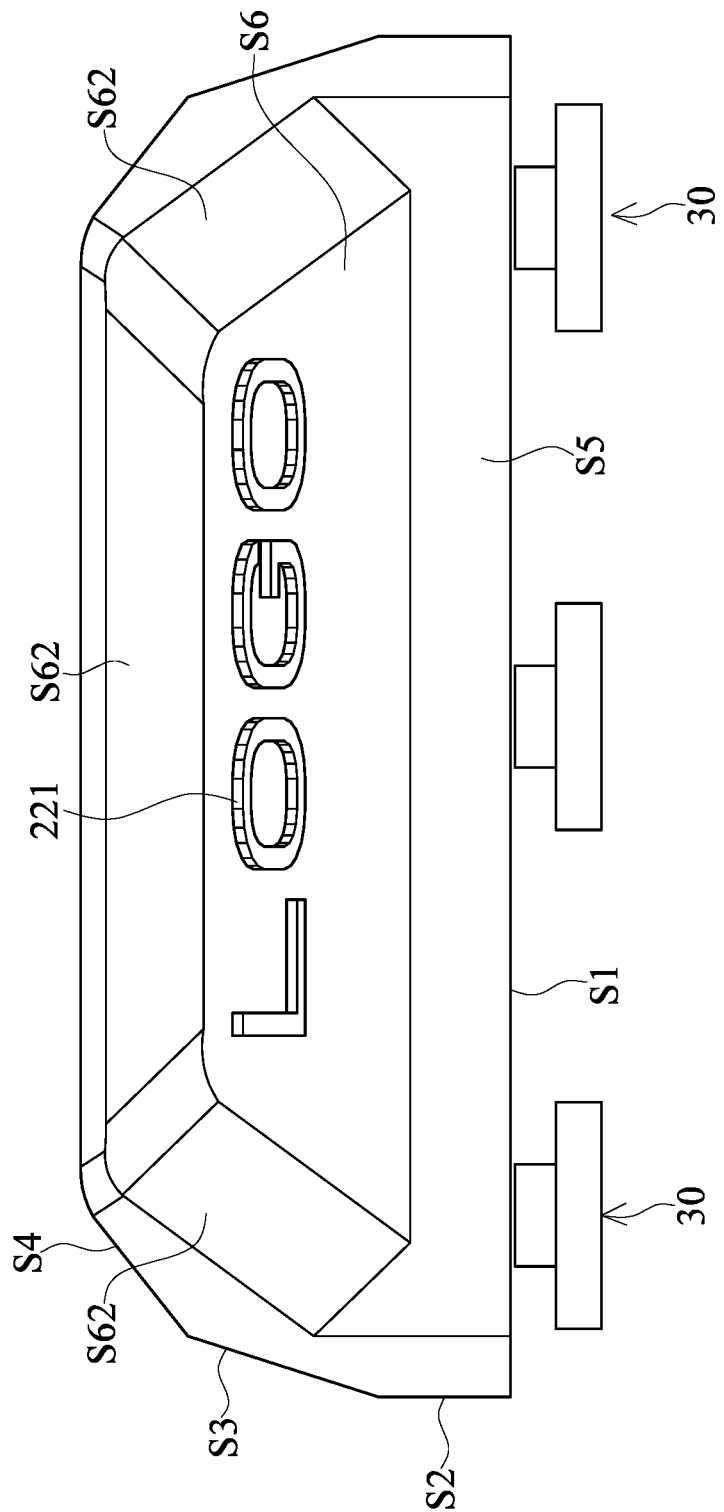
FIG. 6 shows a top view of the light guiding nameplate and the light source according to the embodiment of the present disclosure.

Referring to FIG. 5, from a front perspective, the light guiding nameplate 20 of the present embodiment is trapezoidal. A top portion of the displaying section 22 forms a top side, and a bottom of the fixing section 21 forms a bottom side, and a width of the top side is less than a width of the bottom side. Referring to FIG. 5 and FIG. 6, the top portion of the outer inclined surface S62 is parallel to a top surface of the fixing section 21. From the front perspective, only the outer inclined surface S62 with oblique stripes on both sides is viewable.

In conclusion, the keyboard with the light guiding nameplate enables the light source inside of the keyboard body to emit light to enter into the light incident surface, the light is totally reflected by the reflective surface, and then emerges from the light emergent surface so that the keyboard shows a recognition effect by light emission.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A keyboard, comprising:
    a keyboard body including an outer housing, a plurality of keys, and a circuit board, wherein the plurality of keys are exposed outside of the outer housing, and the circuit board is accommodated inside of the outer housing;
    a light source disposed on the circuit board; and
    a light guiding nameplate having a light incident surface, a reflective surface, a light emergent surface, and a displaying section, wherein the light incident surface is located inside of the outer housing and adjacent to the light source, and the light emergent surface is located outside of the outer housing, and wherein the light source is configured to emit light to enter into the light guiding nameplate from the light incident surface, the light being totally reflected by the reflective surface, and then emerging from the light emergent surface;

wherein the displaying section extends outward from a front edge of the outer housing and faces the plurality of keys, and the light emergent surface is formed on the displaying section.

2. The keyboard with the light guiding nameplate according to claim 1, wherein the light emergent surface of the light guiding nameplate forms a pattern.

3. The keyboard with the light guiding nameplate according to claim 1, wherein the light source includes a plurality of light emitting diodes that are evenly distributed on the light incident surface.

4. The keyboard with the light guiding nameplate according to claim 1, wherein the light guiding nameplate further has a fixing section, wherein the fixing section is fixed inside of the outer housing, and wherein the light incident surface is formed on an end surface of the fixing section.

5. The keyboard with the light guiding nameplate according to claim 4, wherein a top surface of the fixing section is adjacent to the light emergent surface, and a first obtuse angle is formed between the top surface of the fixing section and the light emergent surface.

6. The keyboard with the light guiding nameplate according to claim 5, wherein a bottom surface of the fixing section is adjacent to the reflective surface, wherein a second obtuse angle is formed between the bottom surface of the fixing section and the reflective surface, and the second obtuse angle is greater than the first obtuse angle.

7. The keyboard with the light guiding nameplate according to claim 5, wherein the displaying section further has an extending surface being opposite to the light emergent surface, and the reflective surface is adjacent to the extending surface, and wherein a third obtuse angle is formed between the reflective surface and the extending surface, and the third obtuse angle is greater than the first obtuse angle.

8. The keyboard with the light guiding nameplate according to claim 2, wherein the displaying section of the light guiding nameplate further has an outer inclined surface, and the outer inclined surface surrounds the light emergent surface.

9. The keyboard with the light guiding nameplate according to claim 2, wherein the light guiding nameplate is trapezoidal, a top portion of the displaying section forms a top side, a bottom of the fixing section forms a bottom side, and a width of the top side is less than a width of the bottom side.

* * * * *